US006280027B1

(12) United States Patent
Lawrence et al.

(10) Patent No.: US 6,280,027 B1
(45) Date of Patent: Aug. 28, 2001

(54) INK JET PRINTING PROCESS

(75) Inventors: Kristine B. Lawrence; Paul D. Yacobucci; Csaba A. Kovacs; Steven Evans, all of Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/365,339

(22) Filed: Jul. 30, 1999

(51) Int. Cl.[7] .................................................... G01D 11/00
(52) U.S. Cl. .......................... 347/100; 347/101; 347/105
(58) Field of Search .................................... 347/100, 101, 347/105; 428/195

(56) References Cited

U.S. PATENT DOCUMENTS

| | | | | |
|---|---|---|---|---|
| 4,642,247 | * | 2/1987 | Mouri et al. | 347/105 |
| 4,832,984 | * | 5/1989 | Hasegawa et al. | 347/101 |
| 5,560,996 | * | 10/1996 | Ito et al. | 347/105 |
| 5,656,759 | * | 8/1997 | Ito et al. | 544/103 |

FOREIGN PATENT DOCUMENTS

| | | | | |
|---|---|---|---|---|
| 63174062 | * | 7/1988 | (JP) | G03G/9/08 |
| 03256787 | * | 11/1991 | (JP) | B41M/5/26 |

OTHER PUBLICATIONS

Journal of Chemical Society, Dalton Trans. (1985), (4), 651–8.*

* cited by examiner

*Primary Examiner*—John Barlow
*Assistant Examiner*—Manish S. Shah
(74) *Attorney, Agent, or Firm*—Harold E. Cole

(57) ABSTRACT

An ink jet printing process for improving the dye density and fixability of an ink jet image comprising:

a) providing an ink jet recording element comprising a support having thereon an image-recording layer comprising a mixture of an anionic, water-dispersible polyurethane and a hydrophilic polymer; and b) applying droplets of a liquid ink on the image-recording layer in an image-wise manner, the ink comprising water, humectant and a water-soluble cationic or basic dye.

14 Claims, No Drawings

INK JET PRINTING PROCESS

CROSS REFERENCE TO RELATED APPLICATION

Reference is made to commonly-assigned copending U.S. patent application Ser. No. 09/365,340, filed of even date herewith, entitled "Ink Jet Printing Process", of Lawrence et al; and U.S. patent application Ser. No. 09/364,335, filed of even date herewith, entitled "Ink Jet Printing Process", of Lawrence et al; the teachings of which are incorporated herein by reference.

FIELD OF THE INVENTION

This invention relates to an ink jet printing process for improving the dye density and fixability of an ink jet image ink containing a water-soluble cationic or basic dye.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

The ink jet receiving elements that can be used with the above mentioned inks must meet several requirements including producing high density images that will not smear, bleed or wander when exposed to water for short periods of time.

U.S. Pat. No. 5,560,996 relates to the use of a printing paper containing an intercalated compound that can chemically fix water soluble, cationic or anionic dyes to the paper by an electrostatic attraction between the dye and the intercalated compound. Although this type of an ink receiving layer does provide an image with good fixability, there is a problem with this material in that the overall density of the images generated is too low, as will be shown hereafter.

It is an object of this invention to provide an ink jet printing process for improving the fixability of an ink jet image so that it does not smear or wander when subjected to water for a period of time. It is another object of this invention to provide an ink jet printing process wherein the ink jet image is of high density.

SUMMARY OF THE INVENTION

These and other objects are achieved in accordance with the present invention which comprises an ink jet printing process for improving the dye density and fixability of an ink jet image comprising:

a) providing an ink jet recording element comprising a support having thereon an image-recording layer comprising a mixture of an anionic, water-dispersible polyurethane and a hydrophilic polymer; and b) applying droplets of a liquid ink on the image-recording layer in an image-wise manner, the ink comprising water, humectant and a water-soluble cationic or basic dye.

It was found that the fixability of the printed ink jet image is of high density and does not smear or wander when subjected to water for a period of time.

DETAILED DESCRIPTION OF THE INVENTION

A variety of basic or cationic dyes may be used in the invention as disclosed in U.S. Pat. No. 5,560,996, the disclosure of which is hereby incorporated by reference. In a preferred embodiment of the invention, the dye is an azo dye, a triphenylmethane dye, a phthalocyanine dye, an azine dye, an oxazine dye, a thiazine dye, each having an amine salt residue or a quaternary ammonium group. Such inks may be prepared directly from the basic or cationic dyes or by redissolving the leuco or deprotonated, electrically neutral forms (precursor) of these dyes in dilute aqueous acids, as described in U.S. Pat. Nos. 4,880,769; 3,992,140; and 5,559,076 and U.S. Ser. Nos. 09/299,480 and 09/299,412, both filed Apr. 26, 1999, the disclosures of which are hereby incorporated by reference. Examples of such electrically neutral forms of cationic dyes include the following:

Dye 1

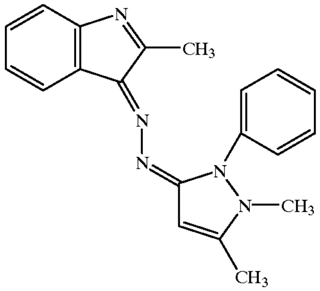

(Precursor of pyrazoleazoindole cationic dye)

-continued

Dye 2

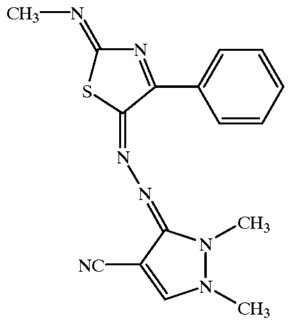

(Precursor of pyrazoleazotriazole cationic dye)

Dye 3

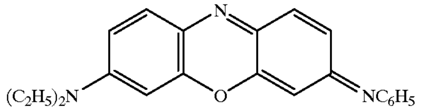

(Precursor of oxazine cationic dye)

Dye 4

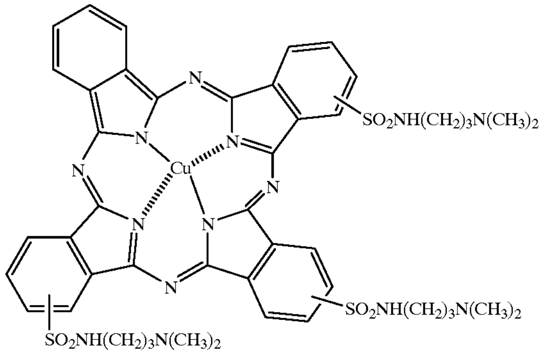

Astra® Blue 6GLL
(Aldrich Chem. Co.)
(an amino-substituted copper phthalocyanine dye)

The dyes described above may be employed in any amount effective for the intended purpose. In general, good results have been obtained when the dye is present in an amount of from about 0.2 to about 5by weight of the ink jet ink composition, preferably from about 0.3 to about 3% by weight. Dye mixtures may also be used.

In a preferred embodiment of the invention, the anionic, water-dispersible polyurethane polymers have the following general formula:

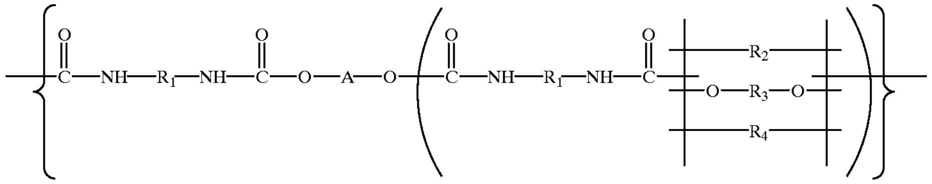

wherein:

$R_1$ is represented by one or more of the following structures:

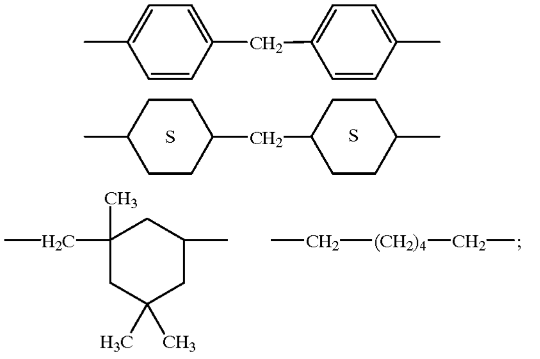

A represents the residue of a polyol, such as a) a dihydroxy polyester obtained by esterification of a dicarboxylic acid such as succinic acid, adipic acid, suberic acid, azelaic acid, sebacic acid, phthalic, isophthalic, terephthalic, tetrahydrophthalic acid, and the like, and a diol such as ethylene glycol, propylene-1,2-glycol, propylene-1,3-glycol, diethylene glycol, butane-1,4-diol, hexane-1,6-diol, octane-1,8-diol, neopentyl glycol, 2-methyl propane-1,3-diol, or the various isomeric bis-hydroxymethylcyclohexanes; b) a polylactone such as polymers of ε-caprolactone and one of the above mentioned diols; c) a polycarbonate obtained, for example, by reacting one of the above-mentioned diols with diaryl carbonates or phosgene; or d) a polyether such as a polymer or copolymer of styrene oxide, propylene oxide, tetrahydrofuran, butylene oxide or epichlorohydrin;

$R_2$ represents the residue of a diol having a molecular weight less than about 500, such as the diols listed above for A; and $R_3$ represents an alkylene, arylene or aralkylene linking group containing one or more phosphonate, carboxylate or sulfonate groups which have been neutralized with a base, such as triethylamine, sodium hydroxide, potassium hydroxide, etc; and $R_4$ represents the residue of a diamine having a molecular weight less than about 500, such as ethylene diamine, diethylene triamine, propylene diamine, butylene diamine, hexamethylene diamine, cyclohexylene diamine, phenylene diamine, tolylene diamine, xylylene diamine, 3,3'-dinitrobenzidene, 4,4'-methylenebis(2-chloroaniline), 3,3'-dichloro-4,4'-biphenyl diaamine, 2,6-diaminopyridine, 4,4'-diamino diphenylmethane, and adducts of diethylene triamine with acrylate or its hydrolyzed products.

The polyurethane employed in the invention preferably has a Tg between about −50° C. and 100° C. A plasticizer may also be added if desired. In a preferred embodiment of the invention, the polyurethane has a number average molecular weight of from about 5,000 to about 100,000, more preferably from 10,000 to 50,000. The anionic, water-dispersible polyurethane employed in the invention may be prepared as described in "Polyurethane Handbook", Hanser Publishers, Munich Vienna, 1985. Examples of anionic, water-dispersible polyurethanes used in the invention include the following:

P-1: AF 420 (Air Products Corp.) Tg=–20° C.
P-2: AF 421 (Air Products Corp.) Tg=0° C.
P-3: W-252 (Witco Corporation) Tg=–49° C.
P-4: W-234 (Witco Corporation) Tg=–28° C.
P-5: W-232 (Witco Corporation) Tg=–12° C.
P-6: W-230 (Witco Corporation) Tg=–12° C.
P-7: W-320 (Witco Corporation) Tg=–12° C.
P-8: W-293 (Witco Corporation) Tg=–35° C.
P-9: F630 Flexthane® (Air Products Corp.)
P-10:

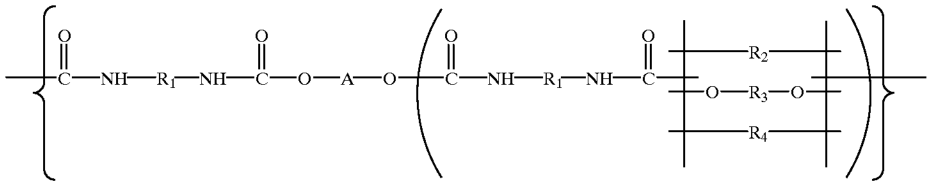

wherein:

R1: 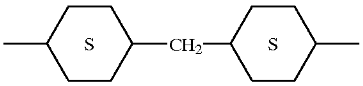

A: $-CH_2CH_2CH_2CH_2-$

R2: 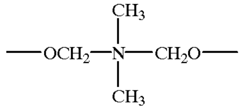

R3: 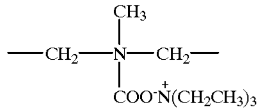

R4: None

The water-dispersible polyurethane employed in the invention may be used in an amount of from about 0.2 to about 26 g/m$^2$, preferably from about 1 to about 16 g/m$^2$.

Any hydrophilic polymer may be used in the invention. For example, there may be used gelatin or polymers having the following formula:

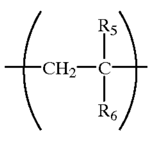

wherein:

$R_5$ represents hydrogen or an alkyl group having from about 1 to about 6 carbon atoms; and $R_6$ represents hydroxyl, pyrrolidone, $NHCOR_7$ or $CONHR_7$, where $R_7$ represents an alkyl group having from about 1 to about 6 carbon atoms.

Examples of the above hydrophilic polymer include polyvinyl alcohol, polyvinyl pyrrolidone, poly(ethyl oxazoline), non-deionized or deionized Type IV bone gelatin, acid processed ossein gelatin or pig skin gelatin. The hydrophilic polymer may be present in an amount of from about 0.4 to about 30 g/m$^2$, preferably from about 1 to about 16 g/m$^2$.

Examples of hydrophilic polymers which may be used in this invention include:

G-1: Type IV non-deionized bone gel, isoelectric point=5.0 (Eastman Chemical Co.)

G-2: Acid Processed Ossein gel, isoelectric point=6.7 (Croda Colloids Ltd.)

G-3: Pig skin deionized gel, isoelectric point=8.0 (SKW Biosystems).

In a preferred embodiment of the invention, the weight ratio of polyurethane to hydrophilic polymer is from about 1:9 to about 8:2, preferably from about 1 to about 1.

The pH of the aqueous ink compositions of the invention may be adjusted by the addition of organic or inorganic acids or bases. Useful inks may have a preferred pH of from about 2 to 7, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethylenediamine.

A humectant is employed in the ink jet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition of the invention is diethylene glycol, glycerol, or diethylene glycol monobutylether.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic. A preferred surfactant for the ink composition of the present invention is Surfynol® 465 (Air Products) at a final concentration of 0.1% to 1.0%.

A biocide may be added to the composition of the invention to suppress the growth of micro-organisms such as molds, fungi, etc. in aqueous inks. A preferred biocide for the ink composition of the present invention is Proxel® GXL (Zeneca Specialties Co.) at a final concentration of 0.05–0.5 wt. %.

A typical ink composition of the invention may comprise, for example, the following substituents by weight: colorant (0.2–5%), water (20–95%), humectant (5–70%), water miscible co-solvents (2–20%), surfactant (0.1–10%), biocide (0.05–5%) and pH control agents (0.1–10%).

Additional additives which may optionally be present in the ink jet ink composition of the invention include thickeners, conductivity enhancing agents, anti-kogation agents, drying agents, and defoamers.

The image-recording layer used in the process of the present invention can also contain various known additives, including matting agents such as titanium dioxide, zinc oxide, silica and polymeric beads such as crosslinked poly (methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV-absorbing agents; mildew-proofing agents; mordants; antistatic agents, anti-oxidants, optical brighteners, and the like. A hardener may also be added to the ink-receiving layer if desired.

The support for the ink jet recording element used in the invention can be any of those usually used for ink jet receivers, such as paper, resin-coated paper, poly(ethylene terephthalate), poly(ethylene naphthalate) and microporous materials such as polyethylene polymer-containing material sold by PPG Industries, Inc., Pittsburgh, Penn. under the trade name of Teslin®, Tyvek ® synthetic paper (DuPont Corp.), and OPPalyte® films (Mobil Chemical Co.) and other composite films listed in U.S. Pat. No. 5,244,861.

The support used in the invention may have a thickness of from about 50 to about 500 $\mu$m, preferably from about 75 to 300 $\mu$m. Antioxidants, antistatic agents, plasticizers and other known additives may be incorporated into the support, if desired. In a preferred embodiment, paper is employed.

In order to improve the adhesion of the image-recording layer to the support, the surface of the support may be subjected to a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 $\mu$m.

The image-recording layer may be present in any amount which is effective for the intended purpose. In general, good results are obtained when it is present in an amount of from about 2 to about 33 g/m$^2$, preferably from about 6 to about 16 g/m$^2$, which corresponds to a dry thickness of about 2 to about 30 $\mu$m, preferably about 6 to about 15 $\mu$m.

The following examples are provided to illustrate the invention.

EXAMPLES

The following ink jet recording elements were used as controls:

C-1 is the ink receiving layer described in Example 2 of U.S. Pat. No. 5,560,996 at a thickness of 8.6 g/m$^2$.

C-2 is the ink receiving layer described in Example 2 of U.S. Pat. No. 5,560,996 at a thickness of 32.3 g/m$^2$.

C-3: Kodak Professional Special Ink Jet Paper, cat #R74 3123

C-4: Kodak Ekta® Jet Clay Coated Paper, cat #842 3469

C-5: Kodak Ekta® Jet Type LF Semi Gloss Paper, cat #898 4486

C-6: Kodak Ink Jet Photographic Quality Paper, cat #800 6298

Example 1

Preparation of a Water Soluble, Cationic Dye-containing Aqueous Ink Composition An ink composition was prepared by dissolving the electrically neutral form of the dye in lactic acid (Aldrich Chemical Co.) in a given volume of filtered deionized water followed by the addition of a stock solution containing glycerol (Acros Co.), diethylene glycol (Aldrich Chemical Co.), Surfynol® 465 (Air Products Corp.) and Proxel® GXL biocide (Zeneca Specialties). Each ink was allowed to stir at room temperature overnight and the surface tension for each ink was measured using a CSC-DuNouy Interfacial Tensiometer, Model 70545 (an average of 3 readings were recorded). The % of each component present in the final ink is summarized in Table 1 below:

TABLE 1

| | Ink Composition | | | |
|---|---|---|---|---|
| Component<br>Dye | I-1<br>Dye 1 | I-2<br>Dye 2 | I-3<br>Dye 3 | I-4<br>Dye 4 |
| % Dye | 1.2 | 0.9 | 0.3 | 2.6 |
| % Lactic acid | 0.7 | 0.7 | 0.4 | 0.7 |
| % glycerol | 6.0 | 6.0 | 6.0 | 6.0 |
| % diethylene glycol | 6.0 | 6.0 | 6.0 | 6.0 |
| % Surfynol ® 465 | 0.25 | 0.25 | 0.25 | 0.25 |
| % Proxel ® GXL | 0.003 | 0.003 | 0.003 | 0.003 |
| % filtered DI water | 86 | 86 | 87 | 84 |
| surface tension, dynes/cm | 37 | 35 | 39 | 36 |

Example 2

Preparation of Control Ink Recording Elements C-1 and C-2

Control elements C-1 and C-2 were prepared as described in Example 2 of U.S. Pat. No. 5,560,996 using a blend of LAPONITE RD® (micro) (Southern Clay Products) and Butvar 76®, polyvinyl butyral (Monsanto Corp.) (1.5/1 ratio).

Example 3

Preparation of Invention Ink Recording Elements E-1 through E-9

The composite side of a polyethylene resin coated photographic grade paper based support was corona discharge treated prior to coating. Ink receptive layers were composed of a mixture of 4.31 g/m$^2$ of polyurethane P-1 through P-9, 4.31 g/m$^2$ of gelatin G-1 and 0.09 g/m$^2$ of S-100 20 $\mu$m beads (ACE Chemical Co.), and coated from distilled water on the above mentioned paper support.

Example 4

Printing

Elements E-1 through E-9 and control elements C-1 through C-6 were printed using an Epson® printer using I-1 through I-4 inks described in Example 1. After printing, all images were allowed to dry at room temperature overnight, and the densities at 100% coverage (Dmax) were measured using an X-Rite 820® densitometer.

The images were then subjected to a waterfastness test (WF) which involves soaking each imaged receiver in room temperature, distilled water for 5 minutes. The density at Dmax was re-read and a % density retained at Dmax was calculated for each ink-receiver combination. The % retained is an indirect measure of how well the dye is fixed to the receiver after printing. Values close to 100% are preferred since they represent better fixation of the dye to the image recording layer. The following results are obtained:

TABLE 2

(Ink I-1)

| Recording Element | Polymer | Blue Dmax Before WF | Blue Dmax After WF | % Retained |
|---|---|---|---|---|
| E-1 | P-1 | 2.11 | 1.91 | 91 |
| E-2 | P-2 | 2.00 | 1.94 | 97 |
| E-3 | P-3 | 2.09 | 2.07 | 99 |
| E-4 | P-4 | 2.21 | 2.34 | 106 |
| E-5 | P-5 | 2.23 | 2.35 | 105 |
| E-6 | P-6 | 2.17 | 2.22 | 102 |
| E-7 | P-7 | 2.21 | 1.88 | 85 |
| E-8 | P-8 | 1.96 | 1.83 | 93 |
| E-9 | P-9 | 1.87 | 1.72 | 92 |
| C-1 | — | 0.71 | 1.01 | 142 |
| C-2 | — | 0.36 | 0.65 | 181 |
| C-3 | — | 1.61 | 0.08 | 5 |
| C-4 | — | 1.36 | 0.26 | 19 |
| C-5 | — | 1.84 | 0.08 | 4 |
| C-6 | — | 1.69 | 0.30 | 18 |

The above results show that the recording elements E-1 through E-9 of the invention, as compared to the control recording elements C-1 through C-6, gave higher Dmax's before WF and the % retained was closer to 100% .

TABLE 3

(Ink I-2)

| Recording Element | Polymer | Green Dmax Before WF | Green Dmax After WF | % Retained |
|---|---|---|---|---|
| E-1 | P-1 | 1.55 | 1.52 | 98 |
| E-2 | P-2 | 1.56 | 1.54 | 99 |
| E-3 | P-3 | 2.10 | 2.12 | 101 |
| E-4 | P-4 | 2.12 | 2.13 | 100 |
| E-5 | P-5 | 2.09 | 2.23 | 107 |
| E-6 | P-6 | 2.12 | 2.12 | 100 |
| E-7 | P-7 | 1.71 | 1.55 | 91 |
| E-8 | P-8 | 1.52 | 1.57 | 103 |
| E-9 | P-9 | 1.66 | 1.60 | 96 |
| C-1 | — | 0.58 | 0.59 | 102 |
| C-2 | — | 0.30 | 0.36 | 120 |
| C-3 | — | 1.06 | 0.10 | 9 |
| C-4 | — | 0.92 | 0.47 | 51 |
| C-5 | — | 0.91 | 0.20 | 22 |
| C-6 | — | 1.73 | 0.51 | 29 |

The above results show that the recording elements E-1 through E-9 of the invention gave higher Dmax's before WF compared to control recording elements C-1 through C-5. The elements of the invention also showed % retained to be closer to 100% than controls C-2 through C-6.

TABLE 4

(Ink I-3)

| Recording Element | Polymer | Red Dmax Before WF | Red Dmax After WF | % Retained |
|---|---|---|---|---|
| E-1 | P-1 | 0.96 | 0.92 | 96 |
| E-2 | P-2 | 0.96 | 0.94 | 98 |
| E-3 | P-3 | 1.05 | 1.0 | 95 |
| E-4 | P-4 | 0.99 | 1.0 | 101 |
| E-5 | P-5 | 1.01 | 1.02 | 101 |
| E-6 | P-6 | 1.03 | 0.99 | 96 |
| E-7 | P-7 | 0.98 | 0.98 | 100 |
| E-8 | P-8 | 0.82 | 0.88 | 107 |
| E-9 | P-9 | 0.95 | 0.96 | 101 |
| C-1 | — | 0.57 | 0.69 | 121 |
| C-2 | — | 0.37 | 0.49 | 132 |
| C-3 | — | 1.88 | 0.24 | 13 |
| C-4 | — | 1.41 | 0.30 | 21 |
| C-5 | — | 2.06 | 0.08 | 4 |
| C-6 | — | 2.01 | 0.27 | 13 |

The above results show that the recording elements E-1 through E-9 of the invention gave higher Dmax's before WF compared to control recording elements C-1 and C-2. The elements of the invention also showed % retained to be closer to 100% than controls C-3 through C-6.

TABLE 5

(Ink I-4)

| Recording Element | Polymer | Red Dmax Before WF | Red Dmax After WF | % Retained |
|---|---|---|---|---|
| E-1 | P-1 | 1.52 | 1.79 | 118 |
| E-2 | P-2 | 1.55 | 1.84 | 119 |
| E-3 | P-3 | 1.72 | 1.89 | 110 |
| E-4 | P-4 | 2.45 | 2.45 | 100 |
| E-5 | P-5 | 2.39 | 2.43 | 102 |
| E-6 | P-6 | 2.47 | 2.41 | 98 |
| E-7 | P-7 | 1.59 | 1.76 | 111 |
| E-8 | P-8 | 1.48 | 1.71 | 116 |
| E-9 | P-9 | 1.98 | 1.88 | 95 |
| C-1 | — | 0.64 | 0.69 | 108 |
| C-2 | — | 0.55 | 0.52 | 95 |
| C-3 | — | 0.85 | 0.05 | 6 |
| C-4 | — | 0.82 | 0.21 | 26 |
| C-5 | — | 0.98 | 0.44 | 45 |
| C-6 | — | 0.93 | 0.54 | 58 |

The above results show that the recording elements E-1 through E-9 of the invention gave higher Dmax's before WF compared to control recording elements C-1 through C-6. The elements of the invention also showed % retained to be closer to 100% than controls C-3 through C-6.

Example 5

Preparation of Invention Ink Recording Elements E-10 through E-16

Recording elements E-10 through E-16 of the invention were coated the same as described in Example 3, except the ratio of P-10 and G-1 were varied keeping the final layer thickness constant at 8.6 $g/m^2$. The amounts for P-10 and G-1 for each composition are summarized in Table 6 below:

TABLE 6

| Recording Element | P-10 ($g/m^2$) | G-1 ($g/m^2$) |
|---|---|---|
| E-10 | 0.9 | 7.7 |
| E-11 | 1.7 | 6.9 |
| E-12 | 2.6 | 6.0 |

TABLE 6-continued

| Recording Element | P-10 ($g/m^2$) | G-1 ($g/m^2$) |
|---|---|---|
| E-13 | 3.4 | 5.2 |
| E-14 | 4.3 | 4.3 |
| E-15 | 5.2 | 3.4 |
| E-16 | 6.0 | 2.6 |

The above receiver elements were printed using I-4 ink from Example 1 and evaluated as described in Example 4. The following results were obtained:

TABLE 7

| Recording Element | Red Dmax Before WF | Red Dmax After WF | % Retained |
|---|---|---|---|
| E-10 | 1.70 | 1.94 | 114 |
| E-11 | 1.68 | 2.07 | 123 |
| E-12 | 1.59 | 2.00 | 126 |
| E-13 | 1.70 | 2.00 | 118 |
| E-14 | 1.70 | 1.91 | 112 |
| E-15 | 1.67 | 1.69 | 101 |
| E-16 | 1.77 | 1.40 | 79 |
| C-1 | 0.64 | 0.69 | 108 |
| C-2 | 0.55 | 0.52 | 95 |
| C-3 | 0.85 | 0.05 | 6 |
| C-4 | 0.82 | 0.21 | 26 |
| C-5 | 0.98 | 0.44 | 45 |
| C-6 | 0.93 | 0.54 | 58 |

The above results show that the recording elements E-10 through E-16 of the invention gave higher Dmax's before WF compared to control recording elements C-1 through C-6. The elements of the invention also showed % retained to be closer to 100% than controls C-2 through C-6.

Although the invention has been described in detail with reference to certain preferred embodiments for the purpose of illustration, it is to be understood that variations and modifications can be made by those skilled in the art without departing from the spirit and scope of the invention.

What is claimed is:

1. An ink jet printing process for improving the dye density and fixability of an ink jet image comprising:

a) providing an ink jet recording element comprising a support having thereon an image-recording layer comprising a mixture of an anionic, water-dispersible polyurethane and a hydrophilic polymer; and b) applying droplets of a liquid ink to impact upon said image-recording layer in an image-wise manner to form a printed ink jet image in said image-recording layer, said ink comprising water, humectant and a water-soluble cationic or basic dye, said printed ink jet image being fixed within said image-recording layer.

2. The process of claim 1 wherein said polyurethane polymer has the formula:

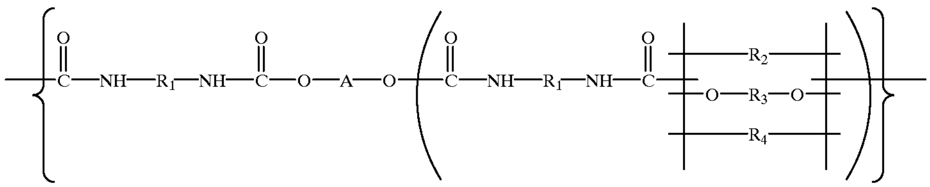

wherein:

$R_1$ is represented by one or more of the following structures:

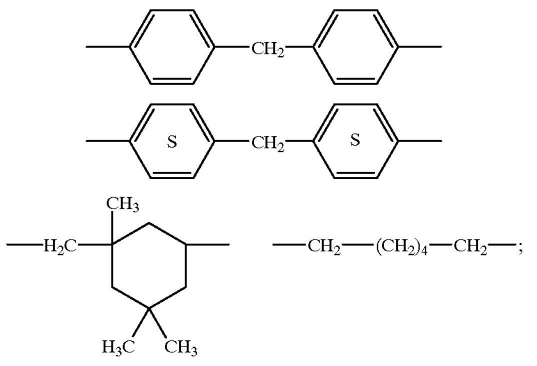

A represents the residue of a polyol;

$R_2$ represents the residue of a diol having a molecular weight less than about 500;

$R_3$ represents an alkylene, arylene or aralkylene linking group containing one or more phosphonate, carboxylate or sulfonate groups which have been neutralized with a base; and $R_4$ represents the residue of a diamine having a molecular weight less than about 500.

3. The process of claim 2 wherein said A is a dihydroxy polyester, a polylactone, a polycarbonate or a polyether.

4. The process of claim 2 wherein $R_1$ is

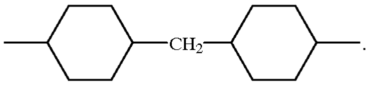

5. The process of claim 2 wherein $R_2$ is $—O(CH_2)_4O—$.

6. The process of claim 2 wherein $R_3$ is an alkylene, arylene or aralkylene linking group containing a carboxylate group.

7. The process of claim 2 wherein $R_4$ is $—NH(CH_2)_2NH—$.

8. The process of claim 1 wherein said hydrophilic polymer is gelatin.

9. The process of claim 1 wherein the weight ratio of polyurethane to hydrophilic polymer is from about 1:9 to about 8:2.

10. The process of claim 1 wherein said dye is an azo dye, a triphenylmethane dye, a phthalocyanine dye, an azine dye, an oxazine dye, or a thiazine dye, each having an amine salt residue or a quaternary ammonium group.

11. The process of claim 1 wherein said dye is a pyrazoleazoindole cationic dye.

12. The process of claim 1 wherein said dye is a pyrazoleazotriazole cationic dye.
13. The process of claim 1 wherein said dye is an oxazine cationic dye.
14. The process of claim 1 wherein said dye is a water soluble salt of:
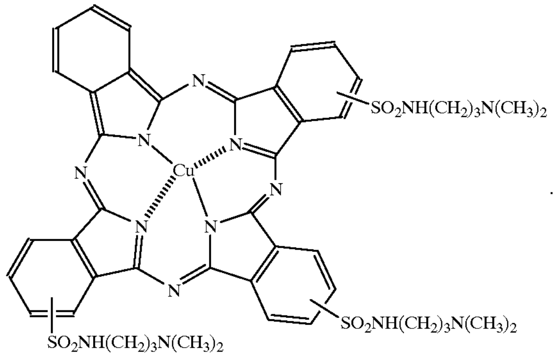
* * * * *